United States Patent
Ran et al.

(10) Patent No.: US 11,546,007 B1
(45) Date of Patent: Jan. 3, 2023

(54) TRANSMITTER EQUALIZATION

(71) Applicant: Cisco Technology, Inc., San Jose, CA (US)

(72) Inventors: Adee O. Ran, Maayan Baruch (IL); Joel Dror, Pardes-Hanna-Karkur (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/643,102

(22) Filed: Dec. 7, 2021

(51) Int. Cl.
*H04B 1/04* (2006.01)
*H04L 25/02* (2006.01)

(52) U.S. Cl.
CPC ......... *H04B 1/0475* (2013.01); *H04L 25/022* (2013.01); *H04B 2001/0491* (2013.01)

(58) Field of Classification Search
CPC .......... H04B 1/0475; H04B 2001/0491; H04L 25/022
See application file for complete search history.

(56) References Cited

U.S. PATENT DOCUMENTS

| | | | |
|---|---|---|---|
| 7,139,321 B2 * | 11/2006 | Giannakis | H04L 25/022 375/260 |
| 2008/0137721 A1 | 6/2008 | Hsu et al. | |
| 2009/0103927 A1 | 4/2009 | Cunningham et al. | |
| 2015/0295650 A1 | 10/2015 | Lee et al. | |
| 2018/0292682 A1 | 10/2018 | Dupuis et al. | |
| 2021/0218472 A1 | 7/2021 | Latchman | |

FOREIGN PATENT DOCUMENTS

JP 5881453 B2 * 3/2016

OTHER PUBLICATIONS

Phil Sun, "100Gb/s Single-lane SERDES Discussion," Credo, dated Jan. 2018, pp. 1-22.
Phil Sun, Jeff Twombly, "Test Results for Balanced SERDES Architecture," Credo, dated May 2018, pp. 1-8.

* cited by examiner

*Primary Examiner* — Jean B Corrielus
(74) *Attorney, Agent, or Firm* — Patterson + Sheridan, LLP (57) ABSTRACT

A method includes transmitting, by a transmitter and over a transmit channel to a remote device, a signal that includes a plurality of signal points and receiving, by a receiver and over a receive channel from the remote device, a response signal that includes a plurality of response points corresponding to the plurality of signal points. The method also includes adjusting the plurality of signal points of the signal until logical values of the plurality of response points invert to produce an adjusted signal, estimating, based on the adjusted signal, a pulse response of the transmit channel, and applying equalization in the transmitter based on the estimated pulse response to reduce an effect of the pulse response on the signal.

20 Claims, 8 Drawing Sheets

TRANSMITTER EQUALIZATION

TECHNICAL FIELD

Embodiments presented in this disclosure generally relate to electronic communications. More specifically, embodiments disclosed herein transmitter equalization.

BACKGROUND

In high speed communications (e.g., communication in a serializer/deserializer), equalization may be used to adjust for dispersion and reflections in the electrical channel and to create a sufficiently high signal to noise ratio (SNR) (e.g., an "eye opening") to operate at the expected bit error ratio (BER). A common equalization scheme involves using a digital feed-forward equalizer (FFE). Implementing FFE in the receiver is the typical approach because the signal at the receiver has passed through the channel and thus, the receiver can detect the effects of the channel on the signal and optimize the FFE accordingly.

In short-reach electrical interfaces to optical transceivers (e.g., co-packaged optics (CPO) or near-packaged optics (NPO)), long equalizers may be used to handle reflections in the channel. Long equalizers, however, may use a substantial amount of power, and it is expected that many CPO/NPO devices will have very low receiver equalization capability.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes transmitting, by a transmitter and over a transmit channel to a remote device, a signal that includes a plurality of signal points and receiving, by a receiver and over a receive channel from the remote device, a response to the signal that includes a plurality of response points corresponding to the plurality of signal points. The method also includes adjusting the plurality of signal points of the signal until logical values of the plurality of response points invert to produce an adjusted signal, estimating, based on the adjusted signal, a pulse response of the transmit channel, and applying equalization in the transmitter based on the estimated pulse response to reduce an effect of the pulse response on the signal. Other embodiments include an apparatus for performing the method.

According to another embodiment, a method includes transmitting a signal that includes a plurality of signal points and receiving a response to the signal. The response includes a plurality of response points corresponding to the plurality of signal points. The method also includes adjusting the plurality of signal points of the signal until logical values of the plurality of response points invert to produce an adjusted signal and applying equalization at a transmitter based on the adjusted signal.

Example Embodiments

This disclosure describes a system that performs equalization at a transmitting device based on response signals from a receiving device (e.g., response signals sent through a loopback feature). The system adjusts signal points in a transmitted signal until the corresponding response points in the response signal invert. For example, if a signal point is a logical high, the system may reduce the magnitude of the signal point until the corresponding response point in the response signal inverts to a logical low. The system may make these adjustments for each signal point in the transmitted signal to determine the magnitudes of the signal points at which their corresponding response points invert. The system then estimates a pulse response of a channel based on these adjustments and applies equalization at the transmitting device based on the estimated pulse response. As a result, the system performs equalization at the transmitting device based on response signals from the receiving device, which allows for long equalization to be performed even though the receiving device has limited equalization capabilities, in certain embodiments.

Figure 1:
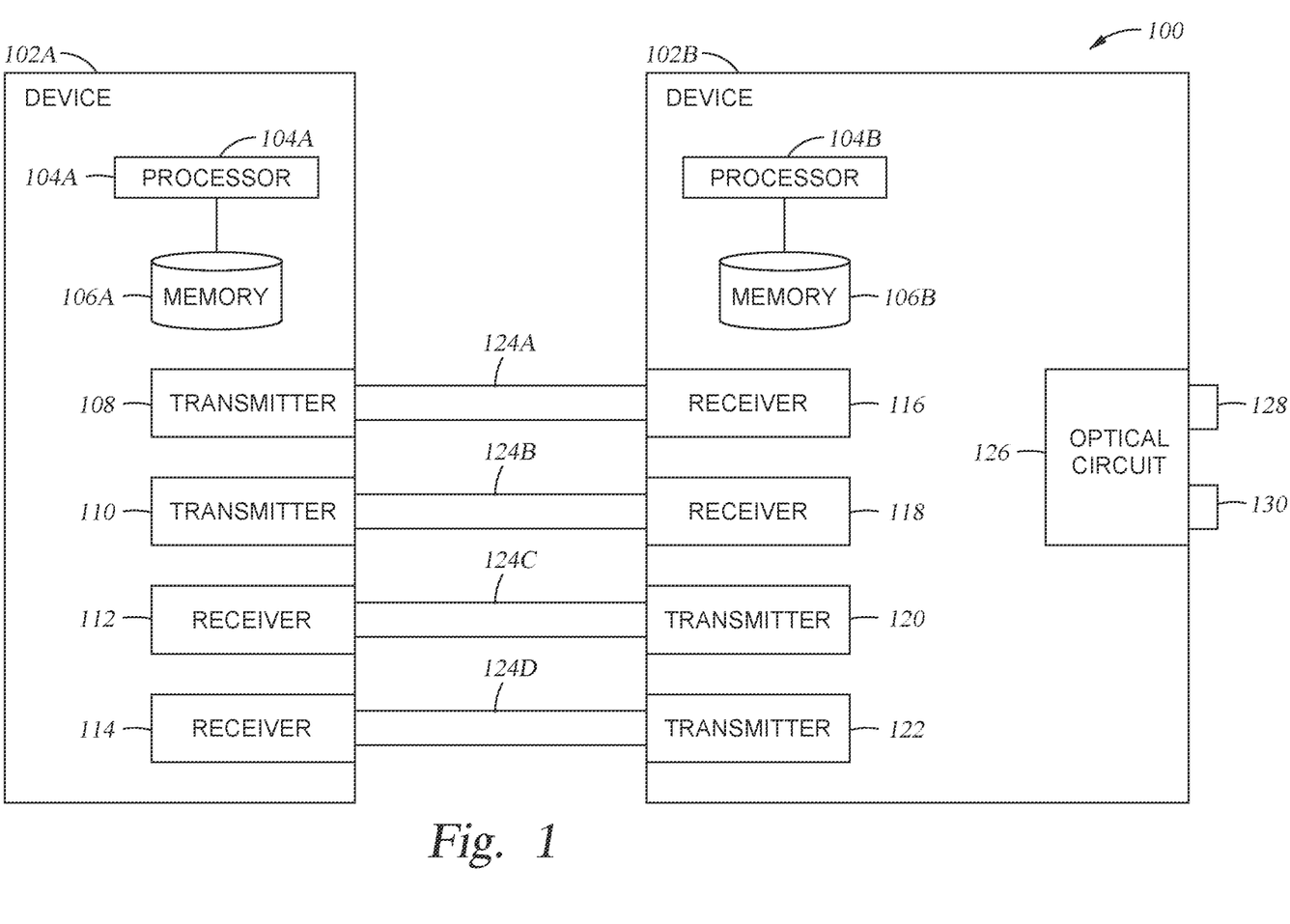
FIG. 1 illustrates an example system.

FIG. 1 illustrates an example system 100. As seen in FIG. 1, the system 100 includes devices 102A and 102B. The devices 102A and 102B communicate signals to one another. In particular embodiments, the device 102A (which may be referred to as a "local device" or "transmitting device") is a communication switch, router, retimer, repeater, or endpoint, and the device 102B (which may be referred to as a "remote device" or "receiving device") is an optical transceiver. The switch and the optical transceiver are implemented as co-packaged optics (CPO) or near-packaged optics (CPO) (e.g., the switch and the optical transceiver may be packaged on the same substrate). Generally, the device 102A transmits electric signals to the device 102B over a transmit channel that introduces distortions into the transmitted signal. The transmitted signal includes signal points at voltage levels representing digital values (e.g., logical high and logical low values). The distortions introduced by the channel affect these voltage levels as the signal travels through the channel.

The device 102B receives the signal along with the distortions and attempts to recreate the originally transmitted signal as a response signal. For example, if the distortions reduced the voltage level of a logically high signal point, the device 102B can still determine that the reduced voltage level is indicative of a logical high value. In response, the device 102B sets a corresponding response point in the response signal at the voltage level representing logical high. The device 102B transmits the response signal back to the device 102A over a receive channel according to a loopback feature of the device 102B. The receive channel may introduce distortions into the response signal as the response signal travels through the response channel.

The device 102A then gradually adjusts the signal points in the transmitted signal until the logical values of the corresponding response points in the response signal invert (e.g., transition from a logical high to a logical low or transition from the logical low to a logical high) to produce an adjusted signal. The device 102A then uses the adjusted signal to estimate a pulse response of the transmit channel and performs equalization according to the estimated pulse response. In this manner, the system 100 performs equalization at a transmitting device rather than a receiving device, in certain embodiments.

As seen in FIG. 1, the devices 102A and 102B include processors 104A and 104B and memories 106A and 106B. The processors 104A and 104B and the memories 106A and 106B may perform the functions or actions of the devices 102A and 102B described herein. In some embodiments, only one of the devices 102A or 102B includes a processor 104 and memory 106. In some embodiments, the processor 104 and the memory 106 are external to the devices 102A and 102B and control the operations of both devices 102A and 102B.

The processor 104 is any electronic circuitry, including, but not limited to one or a combination of microprocessors, microcontrollers, application specific integrated circuits (ASIC), application specific instruction set processor (ASIP), and/or state machines, that communicatively couples to memory 106 and controls the operation of the device 102. The processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 104 may include other hardware that operates software to control and process information. The processor 104 executes software stored on the memory 106 to perform any of the functions described herein. The processor 104 controls the operation and administration of the device 102 by processing information (e.g., information received from the devices 102 and memory 106). The processor 104 is not limited to a single processing device and may encompass multiple processing devices.

The memory 106 may store, either permanently or temporarily, data, operational software, or other information for the processor 104. The memory 106 may include any one or a combination of volatile or non-volatile local or remote devices suitable for storing information. For example, the memory 106 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 106, a disk, a CD, or a flash drive. In particular embodiments, the software may include an application executable by the processor 104 to perform one or more of the functions described herein.

Figure 2:
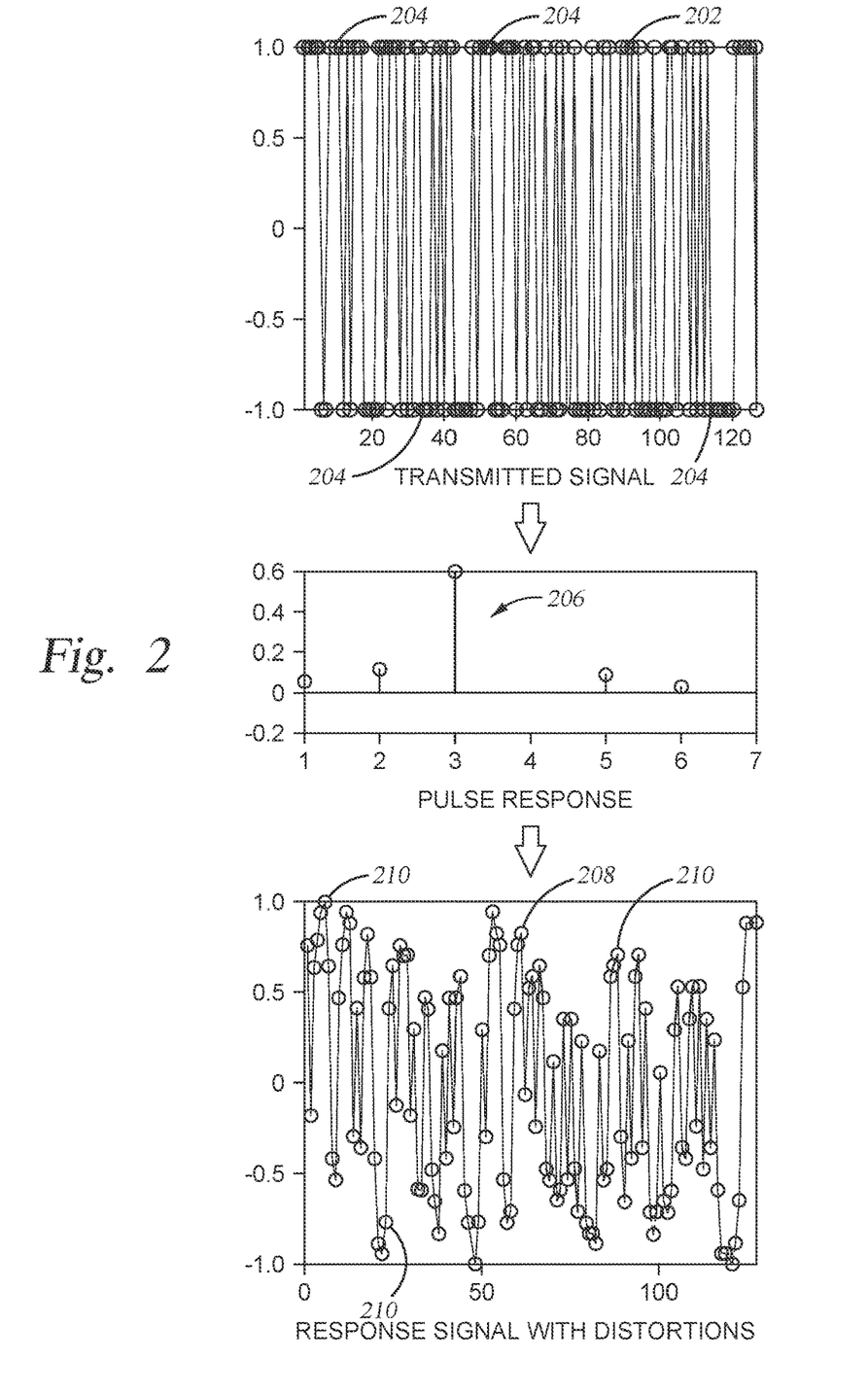
FIG. 2 illustrates an example process in the system of FIG. 1.

The device 102A may be a switch in a CPO or NPO implementation. As seen in FIG. 2, the device 102A includes one more transmitters, such as transmitters 108 and 110 (which may be referred to as "local transmitters"). These transmitters may be digital-to-analog (DAC) based transmitters. Additionally, the device 102A includes one or more receivers, such as receivers 112 and 114 (which may be referred to as "local receivers"). The transmitters 108 and 110 transmit signals to the device 102B over channels 124A and 124B (which may be referred to as "transmit channels"). Additionally, the receivers 112 and 114 receive signals from the device 102B over channels 124C and 124D (which may be referred to as "receive channels").

The device 102B may be an optical transceiver in an NPO or CPO implementation. The device 102B includes one or more receivers, such as receivers 116 and 118 (which may be referred to as "remote receivers"), and one or more transmitters, such as transmitters 120 and 122 (which may be referred to as "remote transmitters"). The receivers 116 and 118 receive signals from the device 102A over the channels 124A and 124B. The transmitters 120 and 122 transmit signals to the device 102A over the channels 124C and 124D. Additionally, the device 102B includes an optical circuit 126 that sends or receives optical signals. The optical circuit 126 may include an optical transmitter 128 and an optical receiver 130. The device 102B may convert electrical signals received from the device 102A into optical signals for communication by the optical circuit 126. Additionally, the device 102B may convert optical signals received by the optical circuit 126 into electrical signals to be communicated to the device 102A.

One or more of the channels 124A, 124B, 124C or 124D may distort the signals communicated through those channels 124A, 124B, 124C or 124D. For example, dispersions or reflections that occur in the channels 124A, 124B, 124C, and 124D may distort the signals communicated through the channels 124A, 124B, 124C and 124D. The system 100 performs equalization prior to transmitting a signal over the channels 124A, 124B, 124C or 124D to adjust for the distortions introduced by the channels 124A, 124B, 124C or 124D. For example, the system 100 may perform equalization at one or more of the transmitters in the device 102A (e.g., the transmitters 108 or 110). The device 102A may learn the characteristics of the channels 124A and 124B through response signals communicated by the device 102B to the device 102A. For example, a loopback feature in the device 102B may be enabled so that the device 102B communicates response signals generated according to signals transmitted by the device 102A, or an external optical fiber cord may be used to create a loopback through the optical circuit 126. The device 102A compares the response signals to the transmitted signals to determine characteristics of the channels 124A and 124B (e.g., pulse responses of the channels 124A and 124B). The device 102A then sets equalizer settings to adjust for the pulse response of the channels 124A and 124B. In this manner, equalization is performed at the transmitters of the device 102A rather than in the device 102B, which avoids low equalization capabilities that may exist in the device 102B.

FIG. 2 illustrates an example process in the system 100 of FIG. 1. Generally, FIG. 2 shows the distortions introduced into a transmitted signal without equalization. To begin, the transmitter 108 in the device 102A (shown in FIG. 1) transmits a signal 202. The transmitted signal 202 includes multiple signal points 204. For clarity only some of the signal points 204 have been labeled. Each of the signal points 204 represents a logical high or a logical low value.

In the example of FIG. 2, the signal points 204 with a logical high value have a voltage level of one, and the signal points 204 with a logical low value have a voltage of minus one. It is contemplated that the signal points 204 may have any suitable voltage levels to indicate logical high and logical low values. The transmitter 108 transmits the signal 202 over the channel 124A to the receiver 116 of device 102B (shown in FIG. 1).

In some embodiments, the transmitter 108 is a DAC-based transmitter with a transmission buffer that is shorter than the length of the full signal 202. As a result, only a portion of the signal 202 is loaded into the buffer for transmitting at any point in time. Because short sub-patterns of the signal 202 may be unbalanced, to prevent possible baseline wander, the sub-pattern occupies only half of the DAC buffer. The other half of the DAC buffer is loaded with the inverse of the sub-pattern, which produces a balanced signal for transmission.

As seen in FIG. 2, the channel 124A has a pulse response 206. This pulse response 206 introduces distortions into the transmitted signal 202 as the signal 202 travels through the channel 124A. For example, the distortions may cause the voltage values of the signal points 204 in the transmitted signal 202 to change. Due to the pulse response 206 of the channel 124A and/or noise, the receiver 116 in the device 102B receives a signal that is a distorted version of the transmitted signal 202. The receiver 116 recovers the logical values from the points in the distorted signal. When the distortion is sufficiently small, the recovered logical values are identical to the logical values represented by the signal points 204 in the originally transmitted signal 202.

The device 102B may be placed in a loopback configuration so that the device 102A may learn the pulse response 206 of the channel 124A. One or more of the processors 104 in the system 100 (shown in FIG. 1) may enable a loopback feature in the device 102B. For example, the processor 104A may communicate a signal to the processor 104B to enable the loopback feature in the device 102B. As another example, an external processor 104 that controls the operation of both devices 102A and 102B may enable the loopback feature in the device 102B.

When the loop back configuration is enabled, the device 102B communicates to the device 102A a response signal with response points representing the logical values 209 recovered from the distorted signal, which are typically identical to the logical values represented by the signal points 204 in the transmitted signal 202 sent from the device 102A. For example, the device 102B may generate the response signal and then send the response signal to the device 102A using the transmitter 120 in the device 102B (as shown in FIG. 1). As another example, the device 102B may generate the response signal, convert the response to an optical signal, communicate the optical signal from the optical transmitter 128 to the optical receiver 130 (e.g., over an external optical fiber cord), convert the optical signal received at the optical receiver 130 back to an electrical response signal, and then communicate that electrical response signal to the device 102A using the transmitter 120. Due to the channel 124C introducing distortions into the response signal as the response signal travels through the channel 124C, the receiver 112 at the device 102A receives a response signal 208 which is a distorted version of the response signal from the device 102B (e.g., the response signal 208 includes response points 210 that may deviate from the voltage levels representing logical high or logical low). The receiver 112 recovers logical levels from the received response signal 208 with distortions. When the distortions introduced by the channel 124C are sufficiently small, the recovered logical values are identical to the logical values represented by the response signal transmitted by device 102B.

As shown in subsequent figures, the device 102A estimates the pulse response of the channel 124A by adjusting the signal points 204 in the transmitted signal 202 while analyzing the behavior of the response points 210 in the received response signal 208. When an adjustment to a signal point 204 is sufficiently large, the corresponding response point 210 in the response signal 208 may change to a voltage level that represents the opposite logical value (e.g., to create errors in the device 102B). By analyzing, for each signal point 204, the amount of adjustment that can be made before creating an error, the device 102A discovers the signal received at the device 102B and learns the pulse response of the channel 124A. The device 102A then performs equalization to adjust for the discovered pulse response.

Figure 3:
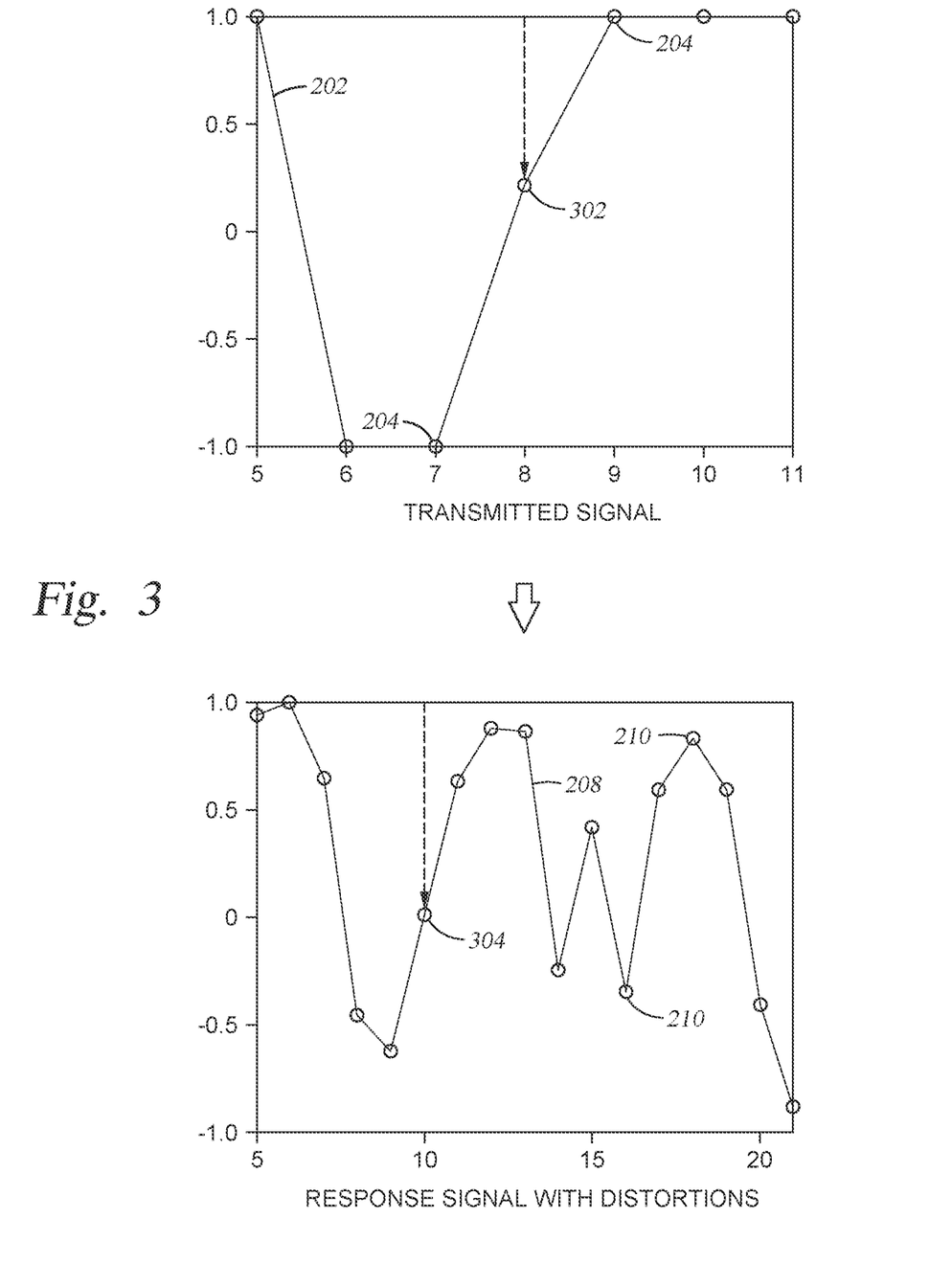
FIG. 3 illustrates an example process in the system of FIG. 1.

FIG. 3 illustrates an example process in the system 100 of FIG. 1. As seen in FIG. 3, the device 102A (shown in FIG. 1) adjusts the voltage level of a signal point 204 in the transmitted signal 202 to produce an adjusted signal point 302. Specifically, the device 102A reduces the magnitude of the voltage of the signal point 204 to produce an adjusted signal point 302. The device 102A may continue to transmit the transmitted signal 202 with the adjusted signal point 302 to the device 102B shown in FIG. 1. The device 102B receives the transmitted signal 202, recovers the logical values, generates a response signal, and communicates the response signal back to the device 102A. That response signal is distorted while traveling back to the device 102A. As seen in FIG. 3, the response signal 208 received at the device 102A includes an adjusted response point 304 that corresponds to the adjusted signal point 302. Stated differently, the device 102A adjusts the voltage of a signal point 204 towards the opposite logical value (e.g., moving a logical high signal point 204 towards logical low or moving a logical low signal point 204 towards logical high) such that the corresponding response point 210 in the received response signal 208 also moves towards the opposite logical value. As long as the adjusted response point 304 has the same logical value as the original signal point 204, the logical values recovered by receiver 116 in the device 102B will not be changed.

The device 102A continues to adjust the voltage of the adjusted signal point 302 until the corresponding adjusted response point 304 in the received response signal 208 is recovered to a different logical value than the original signal point 204. Stated differently, the device 102A continues to move the voltage of the adjusted signal point 302 towards its opposite logical value until the logical value of the adjusted response point 304 changes to the opposite logical value. The device 102A may detect this condition by observing errors in the comparison of logical values recovered from the received response signal 208 and the original logical values represented by the signal points 204. In the example of FIG. 3, the device 102A continues to reduce the voltage of the adjusted signal point 302 from a logical high towards a logical low until the corresponding adjusted response point 304 transitions from a logical high to a logical low. Using the voltage levels in the example of FIG. 3, the device 102A continues to move the voltage of the adjusted signal point 302 towards minus one until the device 102A detects errors in the comparison of the logical value represented by the original signal point 204 and logical value represented by the adjusted response point 304. In this manner, the device 102A determines the voltage of the adjusted signal point 302 at which the corresponding adjusted response point 304 transitions to the opposite logical value. In some embodiments, after determining this voltage, the device 102A reverts the voltage of the adjusted signal point 302 back to the original voltage of the signal point 204.

After the device 102A determines the voltage of the adjusted signal point 302 at which the corresponding adjusted response point 304 inverts, the device 102A repeats the same process for the other signal points 204 in the transmitted signal 202 so that each of the signal points 204 in the transmitted signal 202 are adjusted to a voltage at which their corresponding response points 210 invert. In some embodiments, the device 102A repeats the process for the other signal points 204 sequentially. As shown in subsequent figures, the device 102A then uses the voltage levels of the adjusted signal points 302 to determine a pulse response of the channel 124A (shown in FIG. 1).

Figure 4:
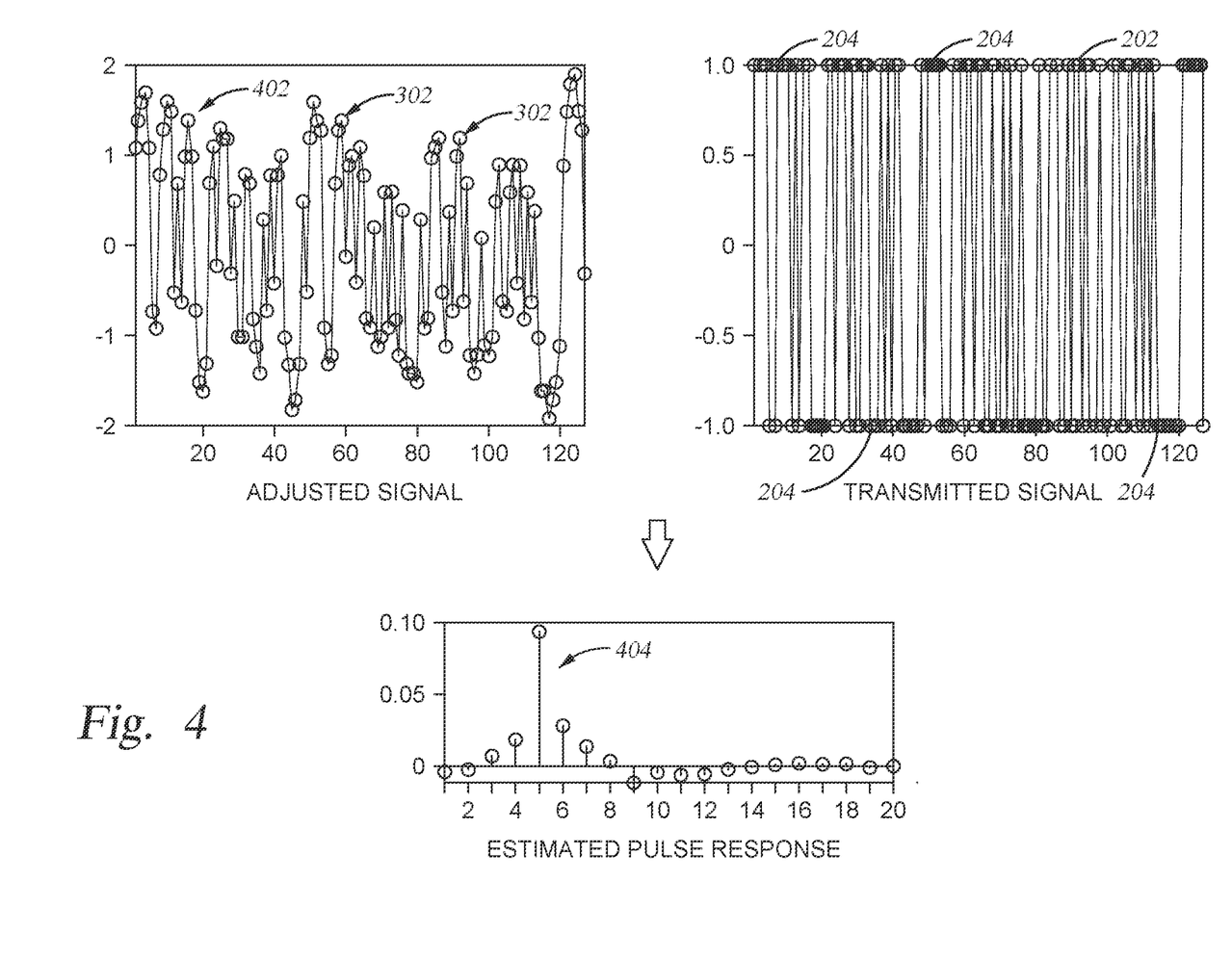
FIG. 4 illustrates an example process in the system of FIG. 1.

FIG. 4 illustrates an example process in the system 100 of FIG. 1. As seen in FIG. 4, after the device 102A has adjusted each of the signal points 204 in the transmitted signal 202, the device 102A produces the adjusted signal 402 that includes the adjusted signal points 302. For clarity, only some of the adjusted signal points 302 are labeled. The adjusted signal 402 indicates the response at the device 1028 to signals transmitted by the device 102A. The device 102A then compares the adjusted signal 402 to the transmitted signal 202 to estimate a pulse response 404 of the channel 124A. For example, the device 102A may subtract the voltages of the signal points 204 with the voltages of their corresponding adjusted signal points 302. The device 102A then uses these differences to estimate the pulse response 404 of the channel 124A. In some embodiments, the device 102A estimates the pulse response 404 using the formula:

$$H(n) = \sum_{i=1}^{N} P(n) \cdot E(1 + \mathrm{mod}(n + i - 2, N)), n \in [1, N]$$

where N is the transmission buffer length (e.g., the size of the buffer in a DAC-based transmitter), P(n) is a signal point 204 in the transmitted signal 202, E(1+mod(n+i−2, N) is the difference between the voltage of a signal point 204 in the transmitted signal 202 and the voltage of its corresponding adjusted signal point 302 in the adjusted signal 402.

Figure 5:
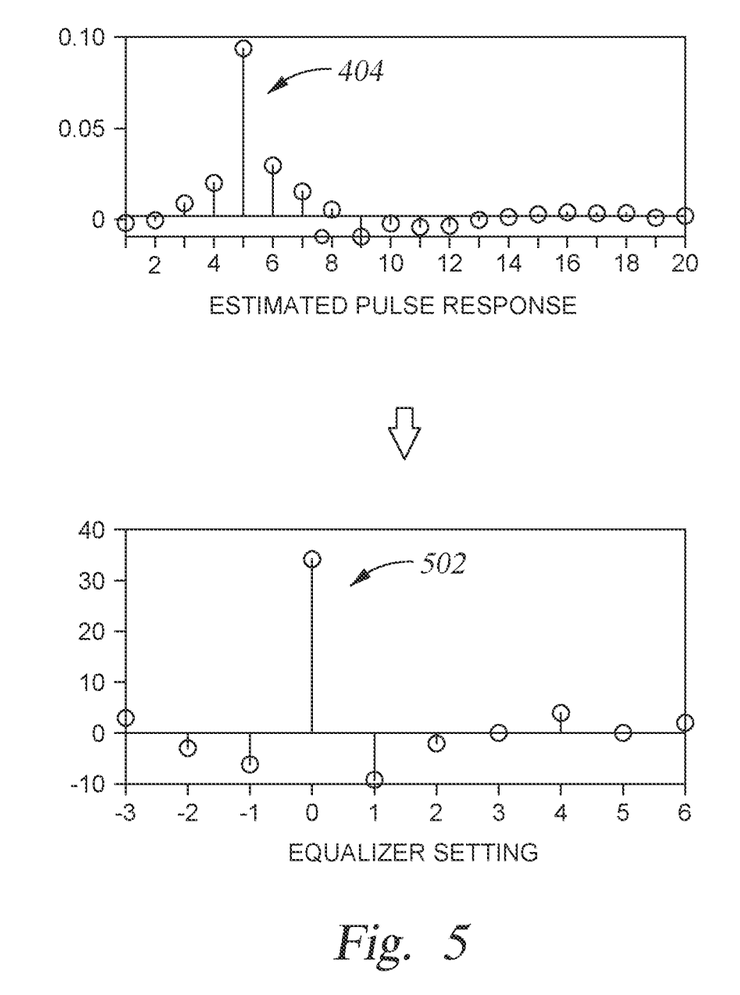
FIG. 5 illustrates an example process in the system of FIG. 1.

FIG. 5 illustrates an example process in the system 100 of FIG. 1. As seen in FIG. 5, the device 102A shown in FIG. 1 uses the estimated pulse response 404 to perform equalization. Specifically, the device 102A uses the estimated pulse response 404 to determine equalizer settings 502. The equalizer settings 502 are then applied during equalization on the transmitted signal 202 to adjust for the pulse response of the channel 124A. For example, the device 102A may determine coefficients for a feed forward equalizer (FFE) to handle the estimated pulse response 404. The device 102A then applies the equalization at the transmitter 108 of the device 102A before the transmitter 108 transmits the signal 202. Due to the equalization, the distortions introduced into the transmitted signal 202 while travelling through the channel 124A are reduced or compensated. As a result, the device 102B receives a signal that is closer to the transmitted signal 202 than without equalization, in certain embodiments.

Figure 6:
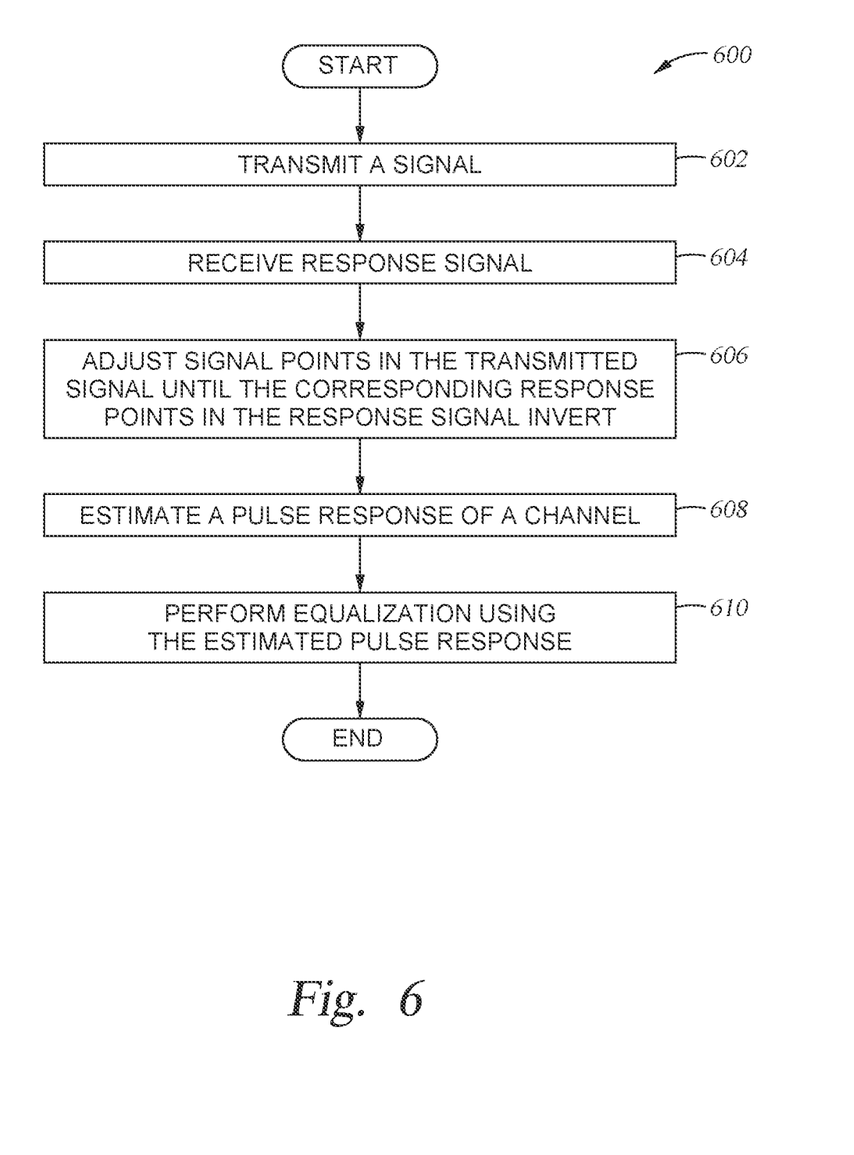
FIG. 6 is a flowchart of an example method performed in the system of FIG. 1.

FIG. 6 is a flowchart of an example method 600 performed in the system 100 of FIG. 1. In particular embodiments, the device 102A and/or the transmitter 108 in the device 102A performs the method 600. By performing the method 600, the device 102A estimates a pulse response 404 of the channel 124A and performs equalization at the transmitter 108 based on the estimated pulse response 404, in particular embodiments.

In block 602, the device 102A transmits a signal 202. The signal 202 may include multiple signal points 204 at logical high or logical low values. The logical high and logical low values may be represented by distinct voltage levels. For example, a logical high value may be represented by a voltage level of one, while the logical low value may be represented by the voltage level minus one. The device 102A may transmit the signal 202 over a channel 124A using a transmitter 108. The channel 124A may have a pulse response that distorts the signal 202 as the signal 202 travels through the channel 124A. As a result, the receiver 116 in the device 102B (shown in FIG. 1) may receive a distorted version of the transmitted signal 202. The device 102B then recovers the logical values from the received, distorted signal and creates a response signal with response points at voltage levels representing the recovered logical values. When a loopback feature in the device 102B is enabled, the device 102B transmits the response signal back to the device 102A. As the response signal travels through a channel back to the device 102A, the channel introduced distortions into the response signal.

In block 604, the device 102A receives the response signal 208 with the distortions introduced by the channel. A receiver 112 in the device 102A may receive the response signal 208. The receiver 112 in device 102A recovers the logical levels represented by the response points 210 in the distorted response signal 208.

In block 606, the device 102A adjusts signals points 204 in the transmitted signal 202 until the logical levels recovered from the response signal 208 are different from the logical levels represented by the signal points 204 in the originally transmitted signal 202. For example, the device 102A may gradually adjust the voltage of a signal point 204 towards the opposite logical value until its corresponding response point 210 transitions to the opposite logical value, and as a result errors are detected in the comparison of logical levels. The device 102A may repeat this process for each signal point 204 in the transmitted signal 202 to produce an adjusted signal 402 with adjusted signal points 302.

In block 608, the device 102A estimates a pulse response 404 of the channel 124A. The device 102A may estimate the pulse response 404 by comparing the adjusted signal points 302 in the adjusted signal 402 with their corresponding signal points 204 in the transmitted signal 202. For example, the device 102A may subtract the voltage of the adjusted signal points 302 with the voltages of their corresponding signal points 204. These differences indicate the effect of the channel 124A on the transmitted signal 202. Using these differences, the device 102A estimates the pulse response 404 of the channel 124A.

In block 610, the device 102A equalizes the transmitter 108 using the estimated pulse response 404. For example, the device 102A may determine coefficients for a FFE so that the FFE performs equalization that handles or offsets some or all of the estimated pulse response 404. The device 102A then performs equalization at the transmitter 108. The equalization overcomes or reduces the effect of the distortions introduced by the channel 124A. As a result, the device 1028 receives a signal that is near or close to the signal that the device 102A initially intended to transmit, in particular embodiments.

Figure 7:
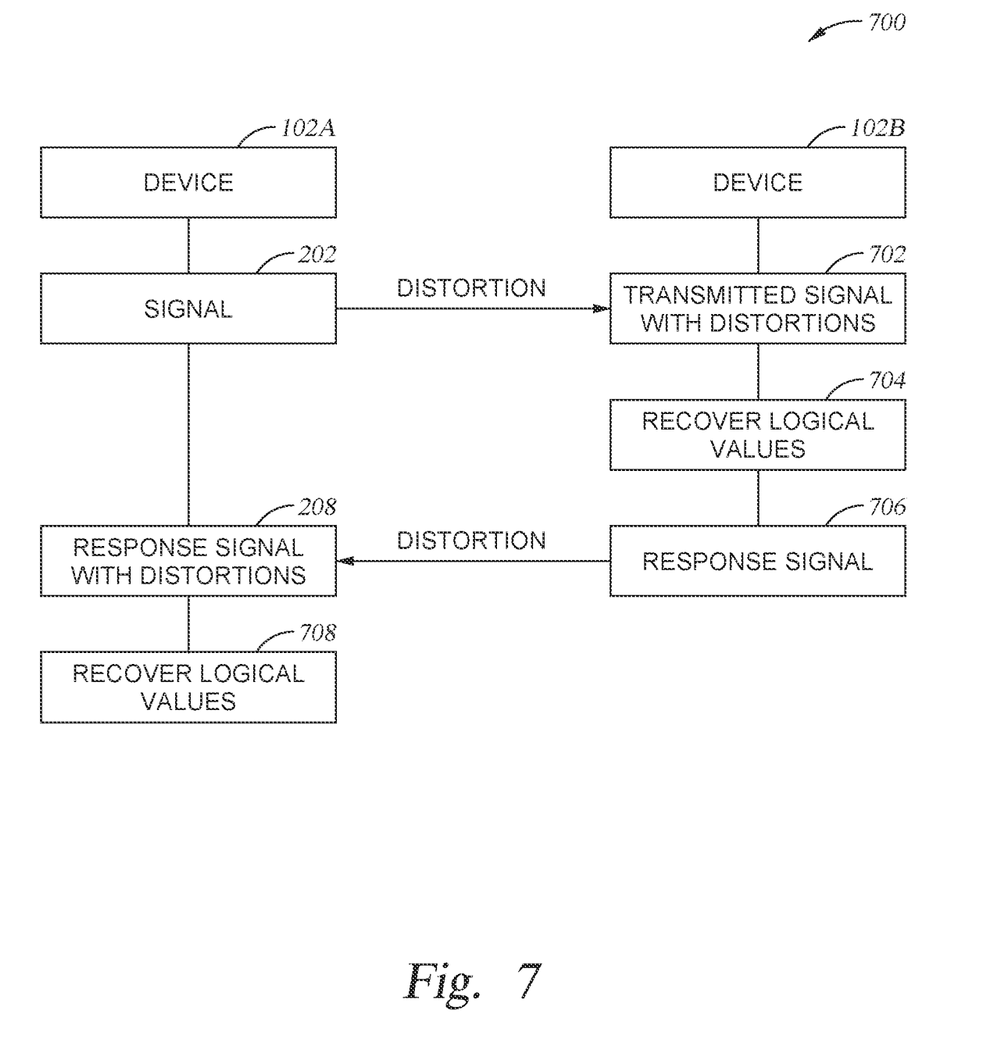
FIG. 7 illustrates an example process in the system of FIG. 1.

FIG. 7 illustrates an example process 700 in the system 100 of FIG. 1. Generally, the process 700 shows a loopback feature in the system 100 of FIG. 1. The process 700 begins with the device 102A transmitting a signal 202 to the device 102B through a channel. The channel introduces distortions into the transmitted signal 202. In block 702, the device 102B receives the transmitted signal with distortions introduced by the channel. For example, the signal points in the transmitted signal 202 may be at voltage levels representing logical high and logical low values. The distortions may cause these voltages levels to deviate from the voltage levels representing logical high and logical low.

In block 704, the device 102B recovers logical values using the transmitted signal with distortions received in block 702. For example, the device 102B may determine whether the signal points in the distorted transmitted signal have voltage levels that are closer to logical high or closer to logical low. After recovering the logical values, the device 102B generates a response signal in block 706. The response signal includes response points with voltage levels that represent the logical values recovered in block 704. The device 102B then transmits the response signal to the device 102A through a channel that introduces distortions into the response signal according to a loopback feature of the device 102B.

The device 102A receives the response signal 208 with distortions. In block 708, the device 102A recovers the logical values using the received response signal 208 with distortions. For example, the device 102A may determine whether response points in the distorted response signal 208 have voltage levels that are closer to logical high or closer to logical low.

Figure 8:
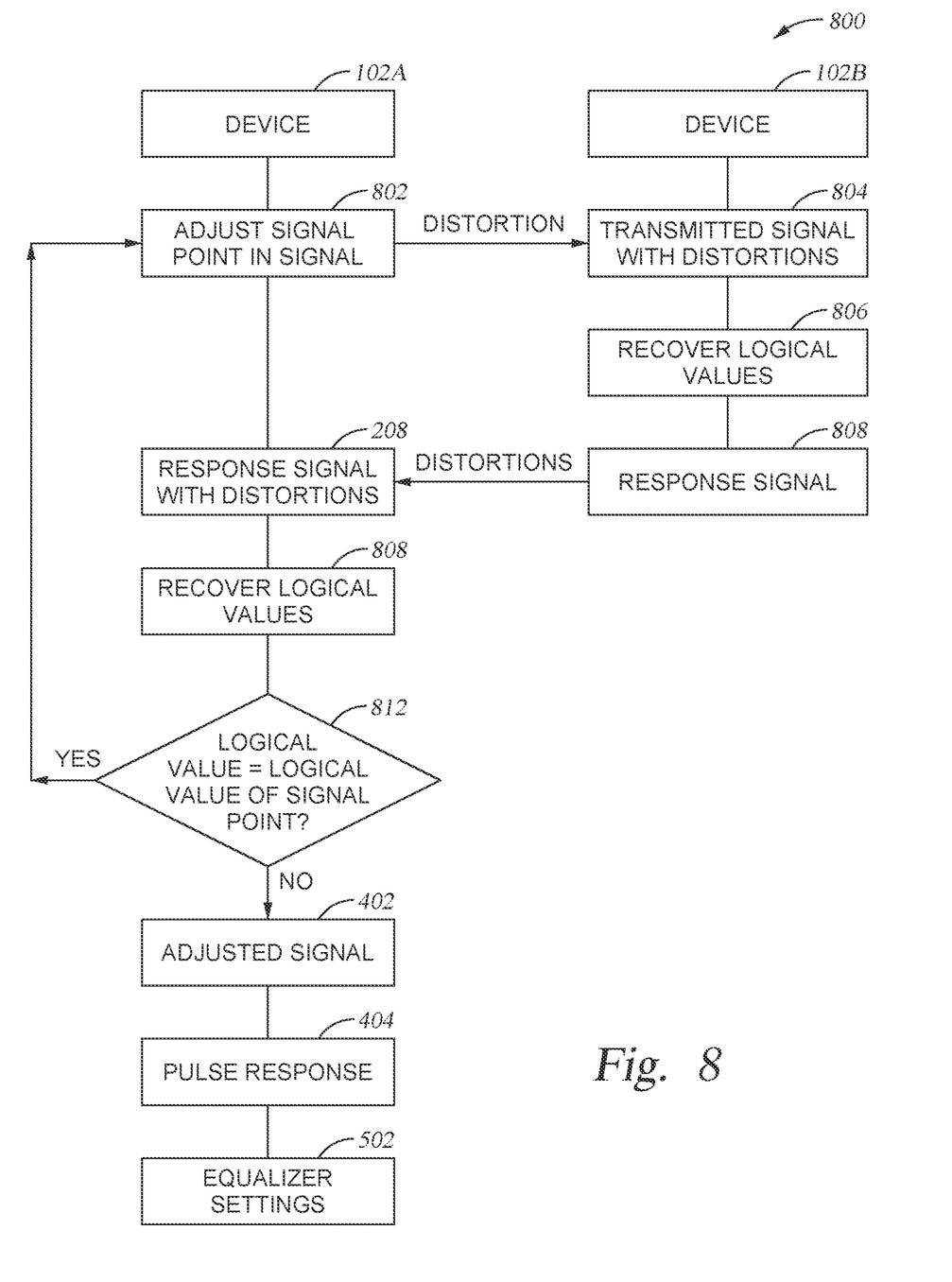
FIG. 8 illustrates an example process in the system of FIG. 1.

FIG. 8 illustrates an example process 800 in the system 100 of FIG. 1. Generally, the process 800 shows how the device 102A performs equalization using the loopback feature shown in FIG. 7. In block 802, the device 102A adjusts a signal point in a signal by adjusting the voltage of the signal point towards a voltage representing the logical value that is opposite the logical value represented by the voltage of the signal point. For example, if the signal point is at a voltage level representing logical high, then the device 102A reduces that voltage level closer to the voltage level representing logical low. The device 102A then transmits the signal with the adjusted signal point to the device 102B.

In block 804, the device 102B receives the transmitted signal with distortions. As discussed above, the distortions may distort the voltage levels of the signal points in the transmitted signal. The device 102B then recovers the logical values using the signal points in the distorted signal in block 806. After recovering the logical values, the device 102B generates a response signal in block 808. The response signal may include response points at voltage levels representing recovered logical values. According to the loopback feature, the device 102B then transmits the response signal to the device 102A over a channel that introduces distortions into the response signal. The device 102A then receives the response signal 208 with the distortions.

In block 810, the device 102A recovers logical values based on the response points in the distorted response signal 208. Specifically, the device 102A recovers the logical value for the response point corresponding to the adjusted signal point that was previously transmitted to the device 102B. In block 812, the device 102A compares the original logical value of the adjusted signal point with the recovered logical value of the response point. If the logical values match, then the device 102A returns to block 802 to further adjust the signal point. If the logical values do not match, then the device 102A proceeds to adjust another signal point in the signal. When the device 102A has adjusted all or a sufficient number of the signal points in the transmitted signal until the recovered logical values of the corresponding response points in the response signal 208 are different from the original logical values of the adjusted signal points, the device 102A generates an adjusted signal 402 using the adjusted signal points.

The device 102A then estimates a pulse response 404 of the channel used to transmit the signal to the device 102B using the adjusted signal 402. The device 102A then determines equalizer settings 502 (e.g., equalizer coefficients) that compensate for the estimated pulse response 404. The device 102A may then perform equalization using the determined equalizer settings 502.

In summary, a system 100 performs equalization at a transmitter 108 using the response signals 208 sent through a loopback feature. The system 100 adjusts signal points 204 in a transmitted signal 202 until the corresponding response points 210 in the response signal 208 invert (e.g., transition to voltage levels representing logical levels that are opposite the logical levels represented by the corresponding signal points 204). For example, if a signal point 204 is a logical high, the system 100 may reduce the magnitude of the signal point 204 until the corresponding response point 210 in the response signal 208 inverts to a logical low. The system 100 may make these adjustments for each signal point 204 in the transmitted signal 202 to determine the magnitudes of the signal points 204 at which their corresponding response points 210 invert. The system 100 then estimates a pulse response 404 of a channel 124A based on these adjustments and performs equalization to compensate for the estimated pulse response 404. As a result, the system 100 performs equalization at the transmitter 108 using response signals 208 from the receiver 116, which allows for long equalization to be performed at the transmitter 108 even though the receiver 116 has limited equalization capabilities, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   transmitting, by a transmitter and over a transmit channel to a remote device, a signal comprising a plurality of signal points;
   receiving, by a receiver and over a receive channel from the remote device, a response signal comprising a plurality of response points corresponding to the plurality of signal points;
   adjusting the plurality of signal points of the signal until logical values of the plurality of response points invert to produce an adjusted signal;
   estimating, based on the adjusted signal, a pulse response of the transmit channel; and
   applying equalization in the transmitter based on the estimated pulse response to reduce an effect of the pulse response on the signal.

2. The method of claim 1, wherein adjusting a signal point of the plurality of signal points comprises reducing a magnitude of a voltage of the signal point.

3. The method of claim 1, wherein the adjusted signal comprises a plurality of adjusted signal points, and wherein determining the pulse response comprises subtracting magnitudes of voltages of the adjusted signal points from magnitudes of voltages of the corresponding signal points in the signal.

4. The method of claim 1, wherein transmitting the signal comprises adding, to a buffer, a portion of the signal and an inverse of the portion of the signal.

5. The method of claim 1, wherein adjusting the plurality of signal points comprises adjusting each of the plurality of signal points sequentially until the logical value of the corresponding response point inverts.

6. The method of claim 1, further comprising activating a loopback feature from a remote receiver to a remote transmitter in the remote device.

7. The method of claim 1, further comprising reverting the adjustment to each of the plurality of signal points in response to the logical value of the corresponding response point inverting.

8. The method of claim 1, wherein the transmitter and the receiver are included in a communication switch, router, retimer, repeater, or endpoint.

9. The method of claim 1, wherein the remote device is included in a co-packaged optics device or a near-packaged optics device.

10. An apparatus comprising:
a transmitter configured to transmit, over a channel, a signal comprising a plurality of signal points to a remote device;
a receiver configured to receive, from the remote device, a response to the signal, wherein the response comprises a plurality of response points corresponding to the plurality of signal points; and
a hardware processor configured to:
adjust the plurality of signal points of the signal until logical values of the plurality of response points invert to produce an adjusted signal;
estimate, based on the adjusted signal, a pulse response of the channel; and
apply equalization in the transmitter based on the estimated pulse response to reduce an effect of the pulse response on the signal.

11. The apparatus of claim 10, wherein adjusting a signal point of the plurality of signal points comprises reducing a magnitude of a voltage of the signal point.

12. The apparatus of claim 10, wherein the adjusted signal comprises a plurality of adjusted signal points, and wherein determining the pulse response comprises subtracting magnitudes of voltages of the adjusted signal points from magnitudes of voltages of the corresponding signal points in the signal.

13. The apparatus of claim 10, wherein transmitting the signal comprises adding, to a buffer, a portion of the signal and an inverse of the portion of the signal.

14. The apparatus of claim 10, wherein adjusting the plurality of signal points comprises adjusting each of the plurality of signal points sequentially until the logical value of the corresponding response point inverts.

15. The apparatus of claim 10, wherein the remote device includes a loopback feature.

16. The apparatus of claim 10, wherein the hardware processor is further configured to revert the adjustment to each of the plurality of signal points in response to the logical value of the corresponding response point inverting.

17. The apparatus of claim 10, wherein the remote device is included in a co-packaged optics device or a near-packaged optics device.

18. A method comprising:
transmitting a signal comprising a plurality of signal points;
receiving a response to the signal, wherein the response comprises a plurality of response points corresponding to the plurality of signal points;
adjusting the plurality of signal points of the signal until logical values of the plurality of response points invert to produce an adjusted signal; and
applying equalization at a transmitter based on the adjusted signal.

19. The method of claim 18, wherein adjusting a signal point of the plurality of signal points comprises reducing a magnitude of a voltage of the signal point.

20. The method of claim 18, wherein the adjusted signal comprises a plurality of adjusted signal points, and wherein the method further comprises subtracting magnitudes of voltages of the adjusted signal points from magnitudes of voltages of the corresponding signal points in the signal.

* * * * *